Dec. 6, 1938.    M. H. EVANS ET AL    2,138,911
BRAKE PEDAL DEPRESSOR
Filed Aug. 11, 1937
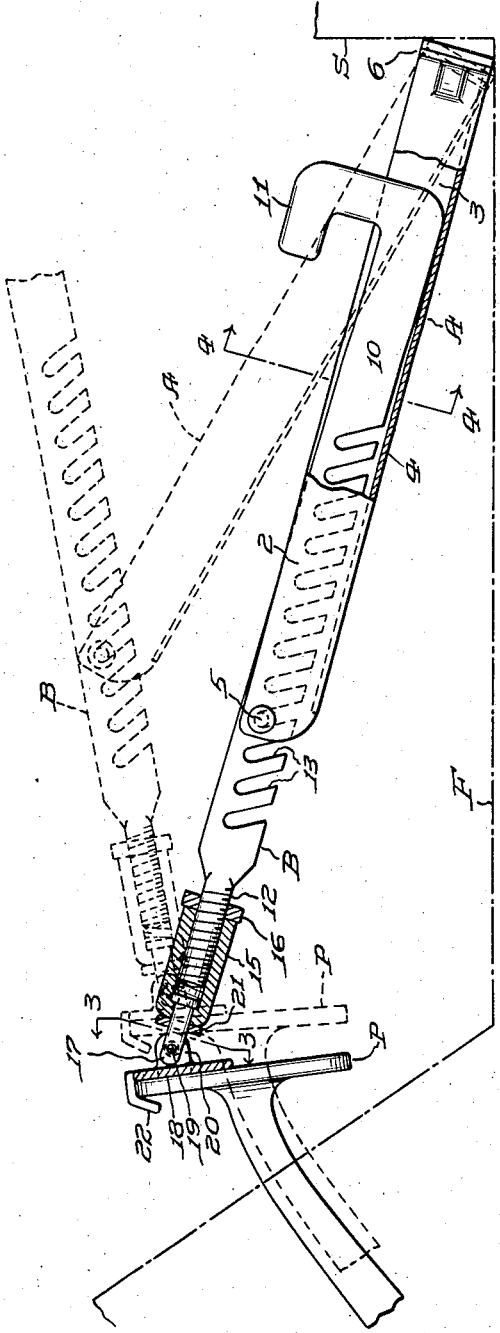
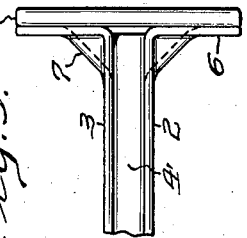
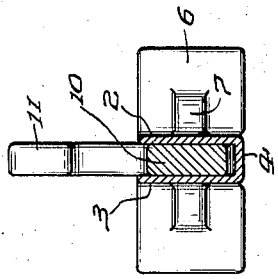
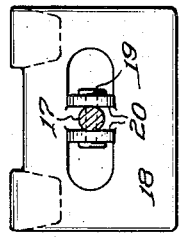
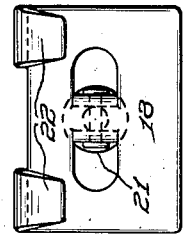
INVENTORS
Merlin Hugh Evans,
Charles H. Sayre.
BY
ATTORNEY
WITNESS
F. J. Hartman.

Patented Dec. 6, 1938

2,138,911

UNITED STATES PATENT OFFICE 2,138,911

BRAKE PEDAL DEPRESSOR

Merlin Hugh Evans and Charles H. Sayre, Elmira, N. Y., assignors to Trayer Products Incorporated, Elmira, N. Y., a corporation of New York Application August 11, 1937, Serial No. 158,476

3 Claims. (Cl. 254—123)

This invention relates to means for setting and releasably holding the brake pedal of an automobile in predetermined depressed position to facilitate adjustment of the brakes so that each individual brake will exert the proper braking force when the brakes are applied in the normal operation of the car.

It is customary when making adjustments of this character to jack up the wheels of the car either successively or concurrently and with the brake pedal held at a given setting to then determine the extent and character of the adjustment necessary for each brake by testing the force required to move the wheel with which it is associated. With modern cars these adjustments must be made very accurately in order that the brakes as a whole shall function properly, and to attain this end, particularly with hydraulic brakes, it is generally necessary to depress and release the pedal a number of times while the adjustments are being made and, of course, it is essential under these conditions that the pedal be each time depressed to exactly the same extent as otherwise faulty adjustment results; moreover, the mechanic must be able to determine the amount of pedal depression very accurately, while it is desirable that the means employed for holding the pedal in depressed position be of such character as to allow their use on substantially all types and makes of cars irrespective of variations in the structure and operation of their brake pedals and associated parts.

Various devices have been proposed for holding brake pedals in depressed position while the brakes are being adjusted, but as far as we are aware none of them has been capable of satisfactorily fulfilling the various conditions which must be met in order to conveniently and properly enable the adjustment of the brakes of modern automobiles in a minimum of time and with minimum of labor.

It is therefore a principal object of our invention to provide an adjustable pedal depressing mechanism operable to hold the brake pedal of any car of usual design in a predetermined depressed position and which, after it has been adjusted to any given setting, can be conveniently operated so as to release the pedal and then return it to and hold it in exactly the same position as often as may be required.

Another object is the provision of a pedal depressor comprising cooperative means whereby an initial "coarse" adjustment may be made to obtain approximately the desired setting of the pedal and a subsequent "fine" adjustment to position it at the exact point desired, the depressor being adapted to thereafter maintain these adjustments even if released and re-set.

A further object is the provision of a device of this character adapted to automatically retain itself in assembled potentially operative relation with the brake pedal and other parts after the pedal has been released and thus in a condition to be readily operated to again depress the pedal to exactly the same point whenever desired.

Other objects, purposes and advantages of the invention will more fully appear from the following description of a preferred embodiment thereof as shown in the accompanying drawing, in which:

Fig. 1 is a side elevation partly in section of the depressor in pedal depressed and pedal released positions, the latter being indicated by dotted lines;

Fig. 2 is a front end elevation of the depressor showing principally the pedal engaging shoe constituting a part thereof;

Fig. 3 is a transverse section on the line 3—3 in Fig. 1;

Fig. 4 is a transverse section on the line 4—4 in Fig. 1, and

Fig. 5 is a fragmentary top plan view of the rear end of the device.

Like characters are used to designate the same parts in the several figures, and the sectional views are taken in the direction of the arrows on the section lines.

Referring now more particularly to the drawing, in Fig. 1 the pedal depressor is shown in operative association with a pedal P of a usual type located in the driver's compartment of an automobile. The forward portion of the floor F of this compartment, indicated by a dot and dash line, through which the pedal shank projects, extends angularly upward and the base of the operator's seat S, which is disposed at its rear end, is indicated by a short upright extension of the floor line.

The pedal depressor comprises a foot section and a lever section respectively generally designated as A and B adapted for releasable pivotal connection in a manner hereinafter more fully described. The former, desirably made of relatively heavy sheet metal, is of channel section throughout the major portion of its length and has its lateral webs 2, 3 projected a little beyond the bottom web 4 at their front ends for the reception of a transverse pivot pin 5 disposed above the plane of the bottom web. At their opposite ends these lateral webs are turned outwardly at right angles to form a foot 6, the metal being crimped at the corners as shown at 7 to enhance the rigidity of the foot. Preferably a pad 8 of leather or other suitable material is cemented or otherwise secured to the foot to prevent it from marring the driver's seat when placed against it.

The lever section B of the device comprises an elongated bar 10 of substantially rectangular solid cross section throughout the major portion of its length and of a size to fit easily between the webs 2, 3 of the other section; one end of this bar is reversely bent on itself to form an actuating handle 11, and its other end formed into a threaded stud 12, the purpose of which will hereinafter appear.

The lower edge of the bar is provided with a series of similar notches 13 adapted to receive pivot pin 5 extending angularly inwardly and upwardly from such edge for a distance a little less than the spacing of the pivot pin from the plane of the bottom web 4 of section A so that, as indicated in full lines in Fig. 1, when the pin is seated in one of these notches, the rear end of the bar adjacent the handle can enter somewhat farther within section A between its side webs 2, 3 than the portion of the bar adjacent the pin, with the result that when the lever is pushed down into section A as far as it can go it is disposed at a small angle to the latter and the parts thus assume positions approximating those of a toggle when slightly over center, whereby pivoting of the sections about the pivot pin under a longitudinally exerted force is prevented, while the pin, through its engagement in the notch, restrains them from relative longitudinal movement under such force.

Stud 12 of section B is received in an internally threaded knurled sleeve 15, and a knurled locking ring 16 is threaded on the stud for releasably fixing the adjusted position of the sleeve thereon, while the front end of the sleeve is loosely constricted about the shank of a swivel pin 17 so that the latter may turn freely therein but is prevented by the head of the pin from being withdrawn therefrom. A pedal engaging shoe 18 is pivotally secured to the opposite end of the swivel pin by a headed-over pivot 19 extending through lugs 20 struck up from the metal of the shoe to lie on either side of the swivel pin, and a loose washer 21 is interposed between these lugs and the forward constricted end of the sleeve to provide supplemental bearing surfaces for the lug edges and thus relieve a portion of the longitudinal force which otherwise would be imposed wholly upon pivot 19.

Shoe 18 is of generally rectangular shape and is provided with a pair of projecting hooks 22 cooperative with the forward face of the shoe to loosely embrace an edge of the pedal and assist in supporting the depressor therefrom.

*Operation*

A pedal depressor constructed substantially as just described is of particular advantage, as has been indicated, under conditions requiring release and resetting of the pedal several times during the operation of adjusting the brakes of an automobile, and reference to its use under such conditions will now be made.

Assuming the pedal to be in normal or released position toward which it is yieldingly urged by a spring in the usual way, the two sections of the depressor are first positioned in such manner that hooks 22 of the shoe on section B will overhang an edge, usually the top edge, of the pedal, and foot 6 on section A will lie in the angle between the base of seat S and the floor with bar 10 of section B slanting upwardly and rearwardly and section A slanting upwardly and forwardly in substantial vertical alignment therewith, the angularity between the sections being now usually somewhat more acute than in the dotted line position of Fig. 1. The sections are next manipulated so as to enter pin 5 of section A in a notch in section B selected to give approximately the desired extent of pedal depression when the sections are ultimately brought into operative position, a result attained by now forcing section B downwardly toward section A as far as it will go, an operation which first brings the sections into straight line relation and finally carries pivot pin 5 slightly over center just before the rear end of section B engages the bottom web of section A which limits its further downward movement, thus bringing the parts to the full line position of Fig. 1.

This closing of the sections together and resultant elongation of the distance between the pedal engaging shoe and foot 6 depresses the pedal a distance determined by the notch in section B which was selected for reception of pin 5, thus effecting the "coarse" adjustment to which reference has been made, and after this has been properly accomplished, the pedal may be located very exactly in a desired position by screwing threaded sleeve 15 in either direction on stud 12 and this adjustment then preserved by setting up the locking ring 16 against the sleeve.

When it is thereafter desired to release the pedal and, in turn, the brakes, handle 11 is merely raised to thereby move the sections into angular relation, as indicated in broken lines in Fig. 1, by relative movement about pivot 5, the spring or other take-up on the pedal acting to return the latter to normal or substantially normal position and thereby entirely releasing the brakes, although any play in the brake linkage, or other looseness, will usually be taken up by the weight of the pedal depressor bearing against the pedal.

In this released position, due to the width of the foot of section A and the weight of the device, the latter remains upright while the angularity of the slots in section B prevents section A falling away therefrom with the result that the parts are maintained in assembled and potentially operative relation as shown in dotted lines in Fig. 1 even though they are exerting no marked depressing action on the pedal.

Consequently when it is again desired to re-depress the pedal to exactly the same extent as that to which it was originally depressed, it is only necessary to return handle 11 to its former fully seated position in the channel formed by the side webs of section A without any readjustment of the device or repositioning of its parts, and it is thus possible to release and reapply the brakes any number of times, and always with the assurance that on each application the pedal will be depressed to the same point, while the wide range of adjustment of which it is capable and the ability of the shoe to swivel on pin 17, permitting its hooks to be engaged at either the lower or the upper edge of the pedal, allows the device to be used for substantially all styles and makes of cars.

It will be apparent from the foregoing that the ability of the pedal depressor to maintain itself in the potentially operative dotted line position of Fig. 1 is primarily due to the angular disposition of notches 13 in bar 10 of section B in consequence of which any of the notches is effective to retain the pivot pin when disposed within it and thereby prevent the sections from automatically separating when positioned between the pedal in normal position and the seat or other element against which foot 6 is braced although permitting the pin to be readily disengaged therefrom preparatory to separating the sections. We regard this arrangement of the notches, therefore, as an important feature of the invention since if the notches were otherwise disposed it would be impossible to maintain the two sections in potentially operative position after they are released from pedal depressing position with consequent marked diminution in the utility and convenience of the device.

While we have herein described one embodiment of our invention with some particularity, it is to be understood we do not thereby desire or intend to limit or confine ourselves thereto as changes and modifications in the form, construction and arrangement of the several parts as well as in the mode of their combination and association will readily occur to those skilled in the art and may be made if desired without departing from the spirit and scope of the invention as defined in the appended claims.

Having thus described our invention, we claim and desire to protect by Letters Patent of the United States:

1. A brake pedal depressor comprising an elongated footed channel section having a transverse pivot adjacent its free end, a lever section having an actuating handle formed at one of its ends and a plurality of notches extending inward from one of its edges and sloping away from said end, a sleeve threaded on its opposite end, and a brake pedal engaging shoe having a universal connection to said sleeve.

2. A brake pedal depressor comprising separable sections, one section being adapted to receive and partially enclose the other and having a transversely disposed pivot pin adjacent one of its ends, the other section having a plurality of notches selectively adapted to receive said pivot pin and extending angularly inward from one of its edges a distance less than that necessary to enable the adjacent portion of the section to fully enter the first section, an actuating handle at one end, a sleeve adjustably mounted on its other end, a pedal engaging shoe disposed adjacent said end, and a universal connection between the sleeve and the shoe.

3. A brake pedal depressor comprising a pair of sections adapted to articulate for pivotal movement, one section including a channel having side webs projecting longitudinally beyond its bottom web at its front end, a transverse pivot pin extending between the projecting portions of said side webs and a foot at the other end projecting laterally outward from said side webs, the other section including a lever portion comprising a plurality of notches selectively adapted to receive said pivot pin and inclining angularly inward from an edge of the said portion toward its front end, the distance between the bottom of each notch and said edge measured normal to the latter being less than the distance between the pin and the bottom web of the first section measured normal to said web, a pedal engaging shoe having a universal connection with said end of the lever portion and an operating handle at its rear end for moving it pivotally about the pin with respect to the first section when the pin is in one of the notches to thereby vary the rectilinear distance between said foot and said shoe and adapted to engage the bottom of the channel when the lever portion is moved sufficiently to bring the sections to a slightly angular over-center relation.

MERLIN HUGH EVANS.
CHARLES H. SAYRE.